United States Patent
Tada

(10) Patent No.: US 10,535,288 B2
(45) Date of Patent: Jan. 14, 2020

(54) INFORMATION OUTPUTTING METHOD, ELECTRONIC EQUIPMENT, AND DISPLAYING APPARATUS

(71) Applicant: CANON KABUSHIKI KAISHA, Tokyo (JP)

(72) Inventor: Mitsuru Tada, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 15/713,835

(22) Filed: Sep. 25, 2017

(65) Prior Publication Data

US 2018/0096640 A1 Apr. 5, 2018

(30) Foreign Application Priority Data

Oct. 4, 2016 (JP) .................................. 2016-196223

(51) Int. Cl.
*G09G 3/20* (2006.01)
*H04N 5/14* (2006.01)

(52) U.S. Cl.
CPC .............. *G09G 3/20* (2013.01); *H04N 5/142* (2013.01); *G09G 2310/02* (2013.01); *G09G 2320/0266* (2013.01); *G09G 2320/0626* (2013.01)

(58) Field of Classification Search
CPC .................. H04N 5/142; G09G 5/005; G09G 2320/0266; G09G 3/20
See application file for complete search history.

(56) References Cited

U.S. PATENT DOCUMENTS

| | | | | |
|---|---|---|---|---|
| 10,181,308 B2* | 1/2019 | Irzyk | ................. | G02B 27/0101 |
| 2007/0229420 A1* | 10/2007 | Hwang | ................. | G09G 3/006 |
| | | | | 345/87 |
| 2013/0329084 A1* | 12/2013 | Tuttle | ................. | H04N 5/23229 |
| | | | | 348/231.99 |
| 2015/0242178 A1* | 8/2015 | Cho | ........................ | G01J 3/506 |
| | | | | 345/1.2 |

FOREIGN PATENT DOCUMENTS

JP 09-200523 A 7/1997

* cited by examiner

*Primary Examiner* — Abbas I Abdulselam
(74) *Attorney, Agent, or Firm* — Cowan, Liebowitz & Latman, P.C.

(57) ABSTRACT

An information outputting method for a displaying apparatus comprises: an image acquiring step of acquiring image data; an identifying step of identifying a first image characteristic of a first display image which is displayed using a first display characteristic of a first displaying apparatus and is based on the image data, and of identifying a second image characteristic of a second display image which is displayed using a second display characteristic of a second displaying apparatus different from the first displaying apparatus and is based on the image data; and an information outputting step of outputting notification information based on a difference between the first image characteristic and the second image characteristic. Thus, it becomes possible to enable a user to grasp that a difference in image quality may occur among the plurality of display apparatuses respectively having different characteristics.

16 Claims, 8 Drawing Sheets

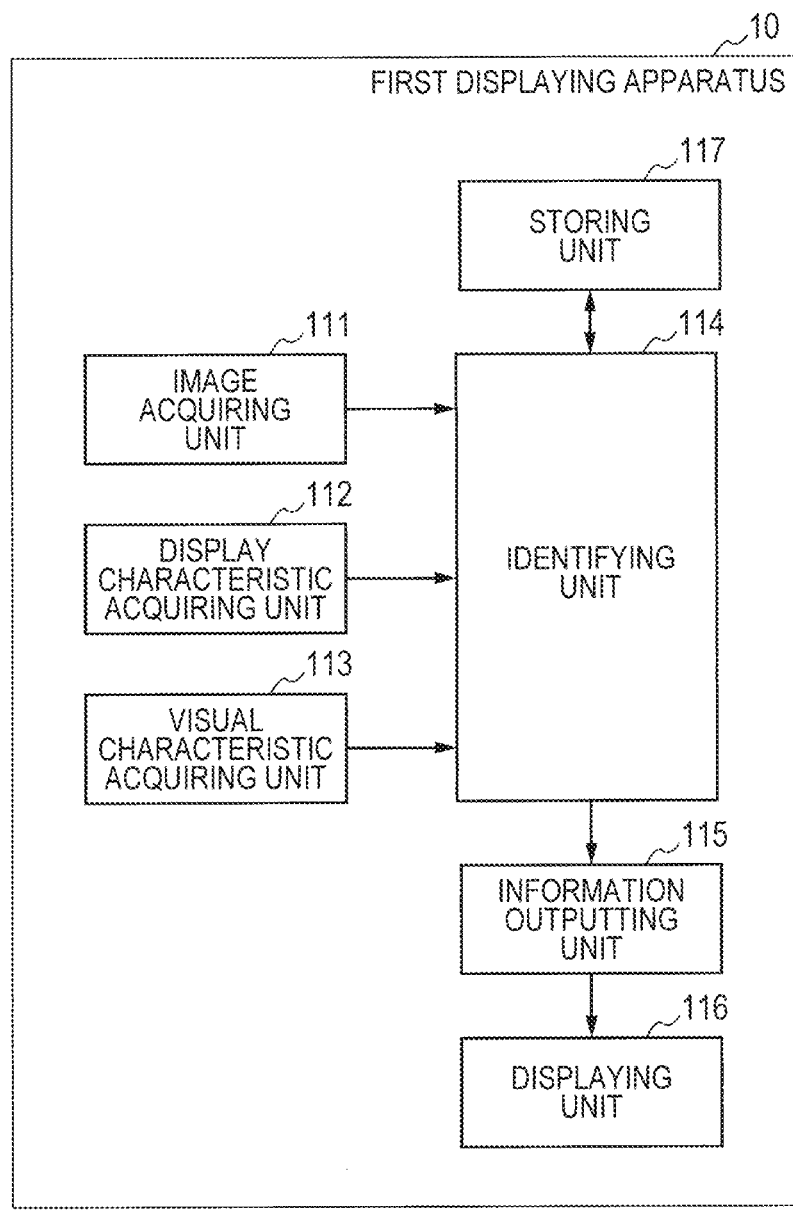

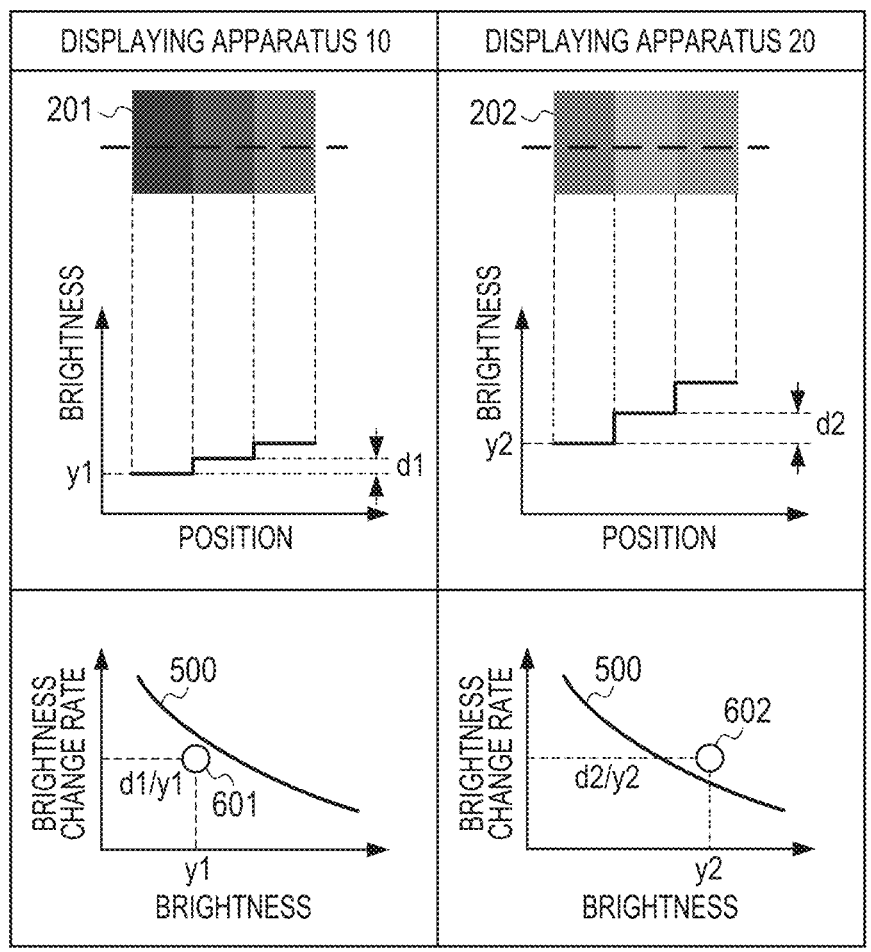

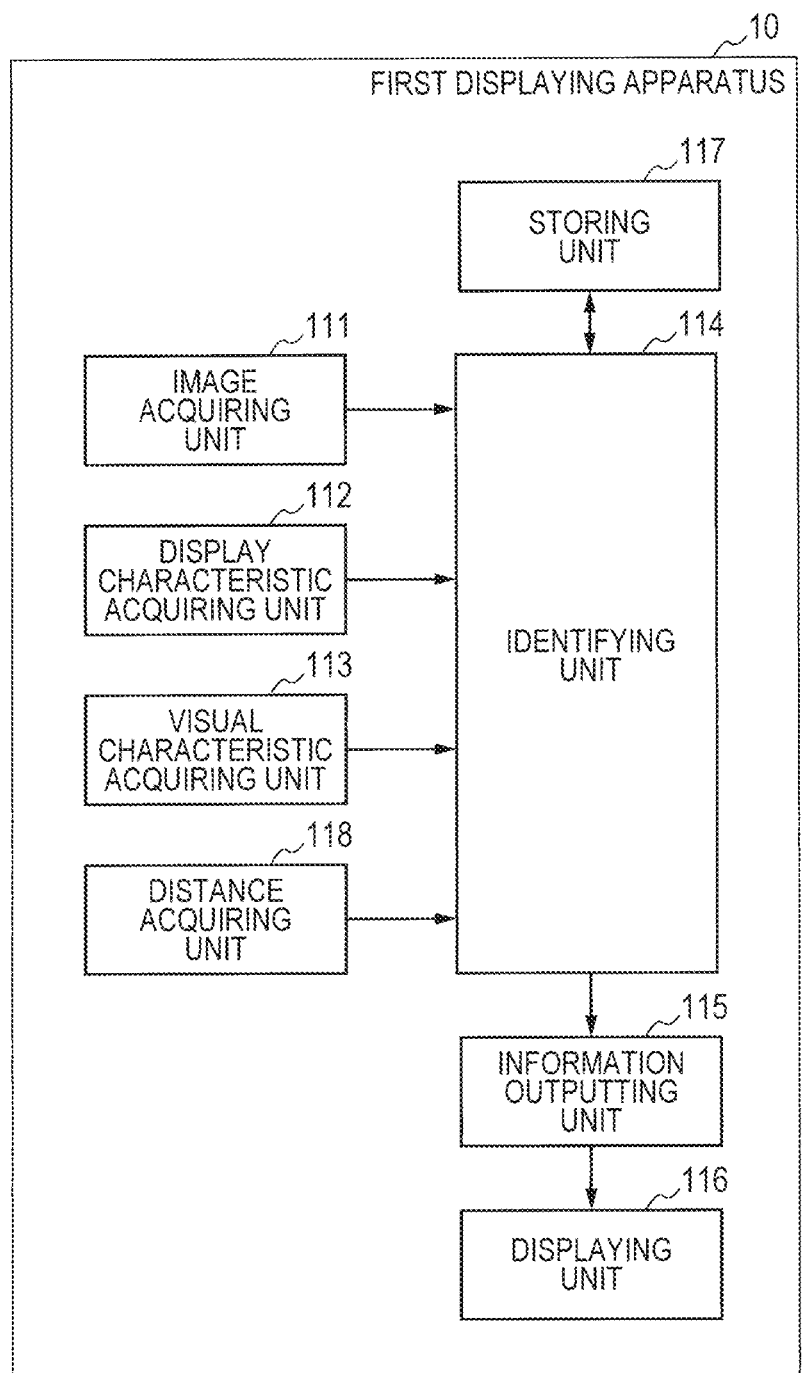

INFORMATION OUTPUTTING METHOD, ELECTRONIC EQUIPMENT, AND DISPLAYING APPARATUS

BACKGROUND OF THE INVENTION

Field of the Invention

The present invention relates to an information outputting method, an electronic equipment and a displaying apparatus which output information related to an image.

Description of the Related Art

It is known that a pseudo contour which is a phenomenon in which unevenness (difference in level) appears in a smooth gradation display area may occur in an image displayed on a displaying apparatus. Japanese Patent Application Laid-Open No. H09-200523 discloses an image processing apparatus which determines whether or not a pseudo contour occurs in a gradation display area of a display image, and then reduces the pseudo contour by superposing a noise on the area of the display image where the pseudo contour occurs.

However, in a case where display characteristics are different respectively for a plurality of displaying apparatuses, there is a case even if the same image is displayed, a degree of whether or not a pseudo contour occurs may change. Therefore, as in the related art, even in case of operating so as not to occur the pseudo contour by superposing a noise on the display image displayed on one displaying apparatus, there is a case of occurring the pseudo contour in the display image displayed on the other displaying apparatus. In the case like this, when a user creates an image while checking only the display image displayed on one displaying apparatus, he/she cannot recognize that the created image is not suitable for the other displaying apparatus. As a result, there is a problem that the user cannot grasp that image quality adjustment is necessary although the created image should be subjected to the image quality adjustment, and thus the image which is not suitable for the other displaying apparatus is created.

SUMMARY OF THE INVENTION

In order to solve the problem as described above, an information outputting method according to the present invention is characterized by comprising: an image acquiring step of acquiring image data; an identifying step of identifying a first image characteristic of a first display image which is displayed using a first display characteristic of a first displaying apparatus and is based on the image data, and of identifying a second image characteristic of a second display image which is displayed using a second display characteristic of a second displaying apparatus different from the first displaying apparatus and is based on the image data; and an information outputting step of outputting notification information based on a difference between the first image characteristic and the second image characteristic.

Besides, an electronic equipment according to the present invention is characterized by comprising: an image acquiring unit configured to acquire image data; an identifying unit configured to identify a first image characteristic of a first display image which is displayed using a first display characteristic of a first displaying apparatus and is based on the image data, and to identify a second image characteristic of a second display image which is displayed using a second display characteristic of a second displaying apparatus different from the first displaying apparatus and is based on the image data; and an information outputting unit configured to output notification information based on a difference between the first image characteristic and the second image characteristic.

Besides, a displaying apparatus according to the present invention is characterized by comprising: an image acquiring unit configured to acquire image data; a displaying unit configured to display a first display image based on the image data; an identifying unit configured to identify a first image characteristic of the first display image which is displayed on the displaying unit by using a first display characteristic of the displaying apparatus, and to identify a second image characteristic of a second display image which is displayed using a second display characteristic of another displaying apparatus and is based on the image data; and an information outputting unit configured to output, to the displaying unit, notification information based on a difference between the first image characteristic and the second image characteristic.

Further features of the present invention will become apparent from the following description of exemplary embodiments with reference to the attached drawings.

BRIEF DESCRIPTION OF THE DRAWINGS

FIG. 2 is a block diagram for describing a constitution of a first displaying apparatus 10 according to the first embodiment.

FIGS. 3A, 3B and 3C are diagrams for describing visual characteristics.

FIG. 7 is a diagram for describing a constitution of the first displaying apparatus 10 according to a third embodiment.

DESCRIPTION OF THE EMBODIMENTS

Preferred embodiments of the present invention will now be described in detail in accordance with the accompanying drawings.

First Embodiment

<Outline of Displaying System F>

Figure 1:
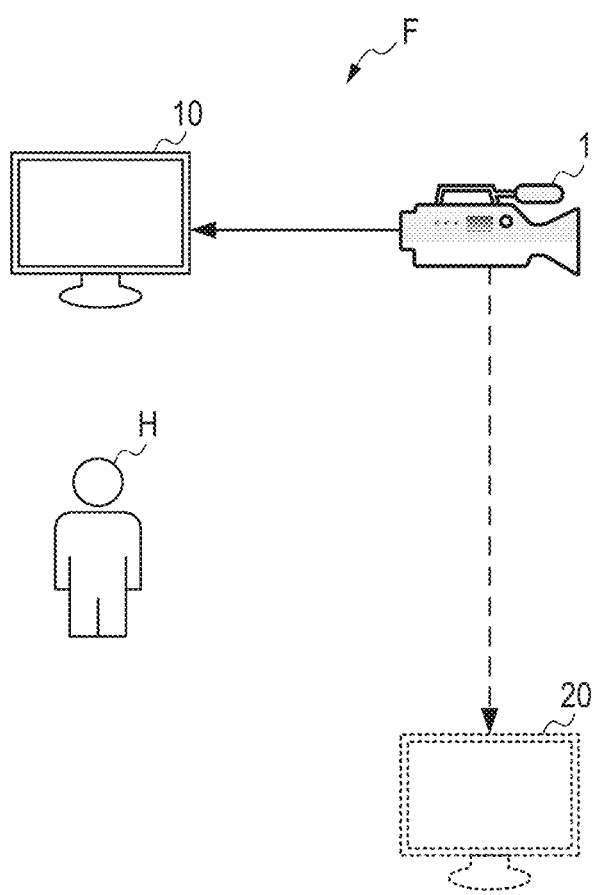
FIG. 1 is a diagram for describing an outline of a displaying system F according to a first embodiment.

FIG. 1 is a diagram for describing an outline of a displaying system F according to the present embodiment. The displaying system F includes a camera 1 and a first displaying apparatus 10. The camera 1 is, for example, a digital video camera, and outputs a photographed image to the first displaying apparatus 10 as a display image (that is, an image to be used for display). The first displaying apparatus 10 is a monitor to be used for adjusting the image photographed by the camera 1. For example, the first displaying apparatus 10 comprises a liquid crystal monitor having a standard dynamic range (hereinafter referred to as SDR) of the maximum brightness 400 cd/m$^2$.

It is assumed that the image photographed by the camera 1 is displayed on a second displaying apparatus 20 having a display characteristic different from that of the first displaying apparatus 10. For example, the second displaying apparatus 20 is a display liquid crystal monitor which displays an image of which the image quality has been adjusted in the first displaying apparatus 10 and has a high dynamic range (hereinafter referred to as HDR) of the maximum brightness 1,000 cd/m$^2$.

In FIG. 1, the first displaying apparatus 10 and the camera 1 are connected to each other by, for example, a video cable. The second displaying apparatus 20 is a virtual displaying apparatus. Although it is assumed that the camera 1 and the second displaying apparatus 20 are not connected to each other, the second displaying apparatus 20 may be connected to the camera 1. When a user H (for example, a photographer) adjusts image quality by displaying the photographed image on the first displaying apparatus 10, the user cannot visually confirm the display image displayed on the second displaying apparatus 20. The first displaying apparatus 10 according to the present embodiment displays information for giving a warning to the user in a case where a problem such as a pseudo contour or the like may occur when the image adjusted by the first displaying apparatus 10 is displayed on the second displaying apparatus 20. By doing so, since the user can grasp a difference in the image quality between the first displaying apparatus 10 and the second displaying apparatus 20, it is possible to create an image which is appropriately displayed also on the second displaying apparatus 20.

<Constitution of First Displaying Apparatus 10>

FIG. 2 is a block diagram for describing the constitution of the first displaying apparatus 10 according to the first embodiment. The first displaying apparatus 10 comprises an image acquiring unit 111, a display characteristic acquiring unit 112, a visual characteristic acquiring unit 113, an identifying unit 114, an information outputting unit 115, a displaying unit 116 and a storing unit 117.

The image acquiring unit 111 acquires the display image. The image acquiring unit 111 comprises, for example, an image input interface which is connected to the camera 1 of outputting the display image. The image acquiring unit 111 acquires image data of a still image or a moving image as the display image. The image acquiring unit 111 transmits the acquired display image to the identifying unit 114.

The display characteristic acquiring unit 112 acquires a first display characteristic of the displaying unit 116 and a second display characteristic of the second displaying apparatus 20 different from the displaying unit 116. For example, the first display characteristic is information which indicates display performance of the displaying unit 116 including the gamma characteristic or the maximum brightness of the displaying unit 116. The first display characteristic may include resolution, response speed, a contrast ratio or a pixel pitch of the displaying unit 116. For example, the second display characteristic is information which indicates display performance of the second displaying apparatus 20 including the gamma characteristic or the maximum brightness of the second displaying apparatus 20. The second display characteristic may include resolution, response speed, a contrast ratio or a pixel pitch of the second displaying apparatus 20.

For example, the display characteristic acquiring unit 112 acquires the first display characteristic and the second display characteristic which are input by a user who operates a not-illustrated operation unit. The display characteristic acquiring unit 112 may acquire the first display characteristic and the second display characteristic via a memory card or a communication line. The display characteristic acquiring unit 112 causes the storing unit 117 to store the acquired first display characteristic and the acquired second display characteristic. The display characteristic acquiring unit 112 may transmit the first display characteristic and the second display characteristic to the identifying unit 114.

The visual characteristic acquiring unit 113 acquires a visual characteristic which indicates the relation between a brightness or a chromaticity and a brightness change ratio or a chromaticity change ratio between a plurality of adjacent pixels perceivable at the brightness or the chromaticity. The brightness change ratio is a ratio of the difference between a first brightness of a first pixel and a second brightness of a second pixel adjacent to the first pixel with respect to the first brightness of the first pixel in an image. That is, the brightness change ratio is acquired by dividing a brightness difference between the first brightness of the first pixel and the second brightness of the second pixel adjacent to the first pixel by the first brightness. The chromaticity change ratio is a ratio of the difference between a brightness of the first pixel and a brightness of the second pixel adjacent to the first pixel with respect to the brightness of the first pixel. In the following description, a process to be performed in the case where the visual characteristic is the relation between the brightness and the brightness change ratio is exemplified. However, the same process is also applied when the visual characteristic has a relation between the chromaticity and the chromaticity change ratio.

For example, the visual characteristic acquiring unit 113 acquires the visual characteristic via an operation unit, a memory card or a communication line. The visual characteristic acquiring unit 113 causes the storing unit 117 to store the acquired visual characteristic. The visual characteristic acquiring unit 113 may transmit the visual characteristic to the identifying unit 114.

The identifying unit 114 comprises, for example, a CPU (central processing unit), and is connected to other operation blocks. By executing a program stored in the storing unit 117, the identifying unit 114 identifies a first image characteristic of a first display image that the display image is displayed on the displaying unit 116 based on the first display characteristic. Further, the identifying unit 114 identifies a second image characteristic of a second display image that the display image is displayed on the second displaying apparatus 20 based on the second display characteristic. For example, the first image characteristic is a characteristic which indicates the relation between the brightness change ratio between the adjacent pixels in the first display image and the perceptible brightness change ratio indicated by the visual characteristic. For example, the second image characteristic is a characteristic which indicates the relation between the brightness change ratio between the adjacent pixels in the second display image and the perceivable brightness change ratio indicated by the visual characteristic. Details of the operation of the identifying unit 114 will be described later.

The information outputting unit 115 is an information outputting unit which outputs notification information based on a difference between the first image characteristic and the second image characteristic to the displaying unit 116. For example, the information outputting unit 115 outputs the notification information to the displaying unit 116. The form of the notification information to be output by the information outputting unit 115 is arbitrary. For example, the information outputting unit 115 outputs the notification information by changing a mode of the image displayed on the displaying unit 116. The information outputting unit 115 may output the notification information in a text format or may output a sound including the notification information.

The displaying unit 116 is a displaying unit which performs display based on the display image acquired by the image acquiring unit 111. The displaying unit also displays the notification information output by the information outputting unit 115. For example, the displaying unit 116 is an SDR liquid crystal panel of the maximum brightness 400 cd/m².

The storing unit 117 is a storing unit which comprises storage media such as a ROM (read only memory), a RAM (random access memory), a hard disk and the like. For example, the storing unit 117 stores the first display characteristic, the second display characteristic, the first image characteristic, the second image characteristic, and the visual characteristic. Besides, the storing unit 117 stores various kinds of data such as a program to be executed by the identifying unit 114, video data, image data and the like.

<Visual Characteristic>

Figure 3A:
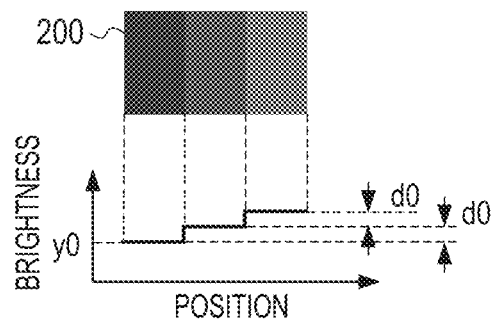

FIGS. 3A to 3C are diagrams for describing the visual characteristic. More specifically, FIG. 3A indicates an image 200 which is an example of the display image to be input to the first displaying apparatus 10 and the second displaying apparatus 20. The image 200 includes three kinds of grayscale images (left-side image, center image, right-side image) each of which has a different gradation (brightness y0). In the image 200, a brightness difference between the brightness of the left-side image and the brightness of the center image and a brightness difference between the brightness of the center image and the brightness of the right-side image are the same and are d0. FIG. 3B indicates a display image 201 and a display image 202 which are visually confirmed when the image 200 is displayed on the first displaying apparatus 10 and the second displaying apparatus 20 respectively.

In the display image 201, the display brightness of the center image is changed d1 with respect to display brightness y1 of the left-side image of the image 200. On the other hand, in the display image 202, the display brightness of the center image is changed by d2 with respect to display brightness y2 of the left-side image of the image 200. As just described, since the first display characteristic of the first displaying apparatus 10 and the second display characteristic of the second displaying apparatus 20 are different from each other, the user visually confirms the different display images even when the same display image is displayed on these displaying apparatuses.

FIG. 3C is the diagram for describing the relation between the brightness change ratio between the adjacent images in the display image and a visual characteristic 500. When the brightness change ratio between the adjacent images in the display image is larger than the brightness change ratio indicated by the curved line of the visual characteristic 500 illustrated in FIG. 3C, the user can perceive that the brightness is changed. On the other hand, when the brightness change ratio between the adjacent images in the display image is smaller than the brightness change ratio indicated by the curved line of the visual characteristic 500 illustrated in FIG. 3C, the user cannot perceive that the brightness is changed.

It should be noted that the visual characteristic 500 is a characteristic which indicates a brightness change ratio by which a brightness difference can be detected according to the brightness as a human's luminous efficacy characteristic, and is acquired by, for example, a well-known DICOM (Digital Imaging and Communications in Medicine) curve or a visual characteristic of a Barten lamp. The visual characteristic 500 may be a characteristic which is approximated by a logarithmic function or the like.

According to FIG. 3C, since a brightness change ratio (d1/y1) 601 in the display image 201 displayed on the first displaying apparatus 10 is smaller than the brightness change ratio indicated by the visual characteristic 500, the user cannot perceive a change in brightness in the display image 201. On the other hand, since a brightness change ratio (d2/y2) 602 in the display image 202 displayed on the second displaying apparatus 20 is larger than the brightness change ratio indicated by the visual characteristic 500, the user can perceive the change in brightness in the display image 202. Therefore, although the user cannot perceive the change in brightness when adjusting the display image by using the first displaying apparatus 10, the user can perceive the change in brightness when displaying the adjusted display image on the second displaying apparatus 20. Consequently, as just described, the first displaying apparatus 10 according to the present embodiment enables the user to recognize whether or not it is necessary to adjust the display image, by outputting notification information based on the difference between the first image characteristic of the display image displayed on the first displaying apparatus 10 and the second image characteristic of the display image displayed on the second displaying apparatus 20.

<Method of Identifying Image Characteristic>

A method of identifying the first image characteristic and the second image characteristic by the identifying unit 114 will be described. In the present embodiment, the identifying unit 114 identifies the first image characteristic which indicates the relation between the brightness change ratio in the pixels included in the first display image and the brightness change ratio corresponding to the brightness of the relevant pixels in the visual characteristic. More specifically, the identifying unit 114 identifies the first image characteristic which indicates whether the brightness change ratio in the pixels included in the first display image is included in the area above the curved line of the visual characteristic 500 of FIG. 3C, or included in the area below the curved line thereof. Besides, the identifying unit 114 identifies the second image characteristic which indicates the relation between the brightness change ratio in the pixels included in the second display image and the brightness change ratio corresponding to the brightness of the relevant pixels in the visual characteristic. More specifically, the identifying unit 114 identifies the second image characteristic which indicates whether the brightness change ratio in the pixels included in the second display image is included in the area above the curved line of the visual characteristic 500 of FIG. 3C, or included in the area below the curved line thereof.

First, the image acquiring unit 111 acquires the image 200 illustrated in FIG. 3A as the display image, and transmits the acquired display image to the identifying unit 114. The identifying unit 114 identifies a brightness value Y of the display image. The identifying unit 114 identifies each brightness value $Y_{ij}$ of m×n pixels $P_{ij}$ (i≤m, j≤n) which are acquired by dividing the display image into the vertical m rows and the horizontal n columns. The identifying unit 114 identifies the brightness value Y of the display image by using the following expression (1).

$$Y = \alpha R + \beta G + \gamma B \qquad (1)$$

Here, R, G and B are respectively the m-row and n-column matrices, and α, β and γ are brightness conversion coefficients to be used when R, G and B are respectively converted to the brightness value Y.

Next, the display characteristic acquiring unit 112 acquires, from the storing unit 117, a first gamma characteristic G1 and a first maximum brightness K1 of the displaying unit 116 as the first display characteristic.

Based on the brightness value Y, the first gamma characteristic G1 and the first maximum brightness K1 of the display image, the identifying unit 114 identifies an optical signal C1 which indicates the brightness value of the first display image that the display image is displayed on the displaying unit 116. Here, C1 is the m-row and n-column matrix, and its component is expressed as $C1_{ij}$ as an optical signal value at the pixel $P_{ij}$. The identifying unit 114 identifies the optical signal value $C1_{ij}$ by using the theoretical maximum value of the brightness value $Y_{ij}$ as $Y_{max}$ and using the following expression (2).

$$C1_{ij} = K1 \times \left(\frac{Y_{ij}}{Y_{max}}\right)^{G1} \quad (2)$$

Subsequently, the display characteristic acquiring unit 112 acquires, from the storing unit 117, a second gamma characteristic G2 and a second maximum brightness K2 of the second displaying apparatus 20 as the second display characteristic. The display characteristic acquiring unit 112 transmits the acquired second display characteristic to the identifying unit 114.

Based on the brightness value Y, the second gamma characteristic G2 and the second maximum brightness K2 of the display image, the identifying unit 114 identifies an optical signal C2 which indicates the brightness value of the second display image that the display image is displayed on the second displaying apparatus 20. Here, C2 is the m-row and n-column matrix, and its component is expressed as $C2_{ij}$ as the optical signal value at the pixel $P_{ij}$. The identifying unit 114 identifies the optical signal value $C2_{ij}$ by using the theoretical maximum value of the brightness value $Y_{ij}$ as $Y_{max}$ and using the following expression (3).

$$C2_{ij} = K2 \times \left(\frac{Y_{ij}}{Y_{max}}\right)^{G2} \quad (3)$$

By using the following expression (4), the identifying unit 114 identifies a brightness change ratio D1 at the pixel $P_{ij}$, by using the optical signal value of the reference pixel $P_{ij}$ in the first display image as $C1_{ij}$ and the optical signal value of a pixel $P_{kl}$ adjacent to the pixel $P_{ij}$ as $C1_{kl}$. The brightness change ratio D1 in the optical signal C1 is a four-dimensional array which is represented by $D1_{ijkl}$. Here, k=i−1, i, i+1, and l=j−1, j, j+1. The brightness change ratio $D1_{ijkl}$ is 0 in case of (i, j)=(k, l). Besides, the brightness change ratio $D1_{ijkl}$ indicates that the brightness value becomes different from that of the adjacent pixel as its absolute value becomes larger.

$$D1_{ijkl} = \left(\frac{C1_{kl} - C1_{ij}}{C1_{ij}}\right) \quad (4)$$

Similarly, by using the following expression (5), the identifying unit 114 identifies a brightness change ratio D2 at the pixel $P_{ij}$, by using the optical signal value of the reference pixel $P_{ij}$ in the second display image as $C2_{ij}$ and the optical signal value of the pixel $P)_k$ adjacent to the pixel $P_{ij}$ as $C2_{kl}$. The brightness change ratio D2 in the optical signal C2 is a four-dimensional array which is represented by $D2_{ijkl}$. The brightness change ratio $D2_{ijkl}$ is 0 in case of (i, j)=(k, l). Besides, the brightness change ratio $D2_{ijkl}$ indicates that the brightness value becomes different from that of the adjacent pixel as its absolute value becomes larger.

$$D2_{ijkl} = \left(\frac{C2_{kl} - C2_{ij}}{C2_{ij}}\right) \quad (5)$$

Subsequently, the identifying unit 114 acquires, from the storing unit 117, a data table T of visual characteristic which indicates the brightness change ratio between the plurality of adjacent pixels perceivable at each brightness. Based on the data table T, the identifying unit 114 identifies visual characteristic data $T(C1_{ij})$ which is the brightness change ratio perceivable at the brightness of the pixel $P_{ij}$. Next, the identifying unit 114 identifies a first image characteristic value $S1_{ijkl}$ which is a difference between the brightness change ratio $D1_{ijkl}$ and the visual characteristic data $T(C1_{ij})$, by using the following expression (6).

$$S1_{ijkl} = D1_{ijkl} - T(C1_{ij}) \quad (6)$$

Similarly, based on the data table T, the identifying unit 114 identifies visual characteristic data $T(C2_{ij})$, which is the brightness change ratio perceivable at the brightness of the pixel $P_{ij}$, at the brightness corresponding to the optical signal value $C2_{ij}$. Next, the identifying unit 114 identifies a second image characteristic value $S2_{ijkl}$ which is a difference between the brightness change ratio $D2_{ijkl}$ and the visual characteristic data $T(C2_{ij})$, by using the following expression (7).

$$S2_{ijkl} = D2_{ijkl} - T(C2_{ij}) \quad (7)$$

Here, for example, if the image characteristic value $S_{ijkl} > 0$, the brightness difference between the corresponding pixel $P_{ij}$ and the adjacent pixel $P_{kl}$ is the brightness difference which is human perceivable, and a pseudo contour occurs. On the other hand, if the image characteristic value $S_{ijkl} \leq 0$, the brightness difference between the corresponding pixel $P_{ij}$ and the adjacent pixel $P_{kl}$ is a brightness difference which is not human perceivable, and a pseudo contour does not occur.

When an inter-apparatus change amount corresponding to the brightness change ratio $D_{ijkl}$ between the pixel $P_{ij}$ and the adjacent pixel $P_{kl}$ is $W_{ijkl}$, the identifying unit 114 identifies the inter-apparatus change amount $W_{ijkl}$ according to any one of the following expressions (8) to (11).

$$W_{ijkl} = -|S2_{ijkl} - S1_{ijkl}| (S1_{ijkl} \leq 0, \text{ and } S2_{ijkl} \leq 0) \quad (8)$$

$$W_{ijkl} = |S2_{ijkl} - S1_{ijkl}| (S1_{ijkl} \leq 0, \text{ and } S2_{ijkl} > 0) \quad (9)$$

$$W_{ijkl} = -|S2_{ijkl} - S1_{ijkl}| (S1_{ijkl} > 0, \text{ and } S2_{ijkl} > 0) \quad (10)$$

$$W_{ijkl} = |S2_{ijkl} - S1_{ijkl}| (S1_{ijkl} > 0, \text{ and } S2_{ijkl} \leq 0) \quad (11)$$

When the inter-apparatus change amount W is 0 or negative, there is no change in the image characteristic values between the displaying unit 116 and the second displaying apparatus 20. On the other hand, when the inter-apparatus change amount W is positive, there is a change in the image characteristic values between the displaying unit 116 and the second displaying apparatus 20.

Subsequently, the identifying unit 114 identifies the plurality of inter-apparatus change amounts $W_{ijkl}$ as the plurality of differences between the plurality of first image characteristics and the plurality of second image characteristics corresponding to the plurality of pixels adjacent to one pixel included in the first display image and the second display image. Then, the identifying unit 114 identifies a perception characteristic value $U_{ij}$ based on the plurality of identified inter-apparatus change amounts $W_{ijkl}$. More specifically, the identifying unit 114 identifies the perception characteristic value $U_{ij}$ for determining whether or not the user can perceive a pseudo contour, based on the inter-apparatus change amount $W_{ijkl}$ for eight pixels kl adjacent to the pixel $P_{ij}$.

For example, the identifying unit 114 determines the perception characteristic value $U_{ij}$ based on a result acquired by comparing the number of $W_{ijkl}$ of 0 or smaller with a threshold Vth. When the number of $W_{ijkl}$ equal to or smaller than 0 is equal to or larger than the threshold Vth, the identifying unit 114 determines that the pseudo contour based on the change in brightness at the pixel $P_{ij}$ is not perceivable, and sets the perception characteristic value $U_{ij}$ to 0. On the other hand, when the number of $W_{ijkl}$ equal to or smaller than 0 is smaller than the threshold Vth, the identifying unit 114 determines that the pseudo contour based on the change in brightness at the pixel $P_{ij}$ is perceivable, and sets the perception characteristic value $U_{ij}$ to 1. The threshold Vth may be a value determined by subjective evaluation, or may be a value set by the user.

The information outputting unit 115 causes the displaying unit 116 to display notification information which indicates that the pseudo contour may occur, based on the inter-apparatus change amount $W_{ijkl}$ which is the difference between the first image characteristic value S1 and the second image characteristic value S2. For example, the information outputting unit 115 outputs the notification information based on the perception characteristic value $U_{ij}$ which is identified based on the plurality of inter-apparatus change amounts $W_{ijkl}$ being the plurality of differences between the first image characteristic value S1 corresponding to the plurality of adjacent pixels and the second image characteristic value S2 corresponding to the plurality of adjacent pixels. More specifically, when the perception characteristic value $U_{ij}$ corresponding to at least one pixel Pi) is 1, the information outputting unit 115 causes the displaying unit 116 to display notification information for giving a warning that the pseudo contour occurs. When the perception characteristic value $U_{ij}$ corresponding to all the pixels $P_{ij}$ is 0, the information outputting unit 115 does not cause the displaying unit 116 to display the notification information for giving a warning.

Instead of outputting the notification information when the perception characteristic value $U_{ij}$ is 1, the information outputting unit 115 may output the notification information when the difference between the first image characteristic value S1 and the second image characteristic value S2 is equal to or larger than a predetermined threshold. By doing so, it becomes easy for the user to recognize that there is a high possibility that the pseudo contour occurs when a change between the first display image and the second display image is large.

The information outputting unit 115 causes at least one of the first displaying apparatus 10 and the second displaying apparatus 20 to display an image in which the notification information is superposed on the display image. For example, the information outputting unit 115 causes the displaying unit 116 to display an image in which the notification information based on the perception characteristic value U is superposed on the display image acquired by the image acquiring unit 111.

Figure 4A:
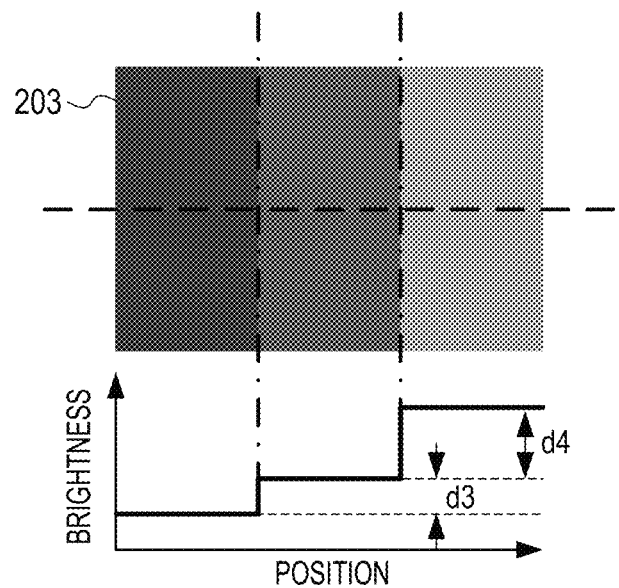
FIGS. 4A, 4B, 4C and 4D are diagrams for describing notification information to be output by an information outputting unit 115.

FIGS. 4A to 4D are diagrams for describing the notification information to be output by the information outputting unit 115. An image 203 illustrated in FIG. 4A includes three kinds of grayscale images (left-side image, center image, right-side image) each of which has a different gradation. A gradation change amount d3 between the left-side image and the center image and a gradation change amount d4 between the center image and the right-side image are different from each other. In FIG. 4A, the alternate long and short dashed line indicates the positions of the pixel of which the perception characteristic value U at which the perceivable pseudo contour occurs in the second displaying apparatus 20 although the perceptible pseudo contour does not occur in the displaying unit 116 is 1.

Figure 4B:
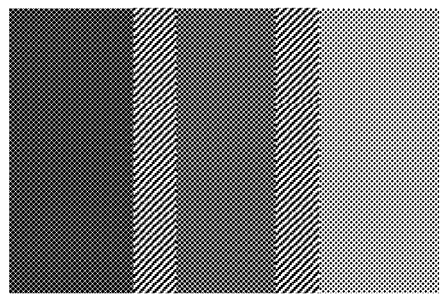

FIG. 4B is the diagram for describing an example in which the information outputting unit 115 superposes a hatched image on the pixel of which the perception characteristic value U is 1 in the image 203 and causes the displaying unit 116 to display the acquired image. As just described, the information outputting unit 115 emphasizes and displays the pixels of which the perception characteristics are changed based on the difference between the first image characteristic and the second image characteristic, so that the user using the first displaying apparatus 10 can easily grasp that the pseudo contour may occur in the second displaying apparatus 20.

Figure 4C:
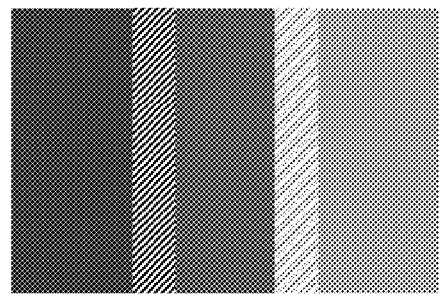

FIG. 4C is the diagram for describing an example in which the information outputting unit 115 superposes a hatched image acquired by changing the brightness of the hatched image in accordance with the value of the inter-apparatus change amount W to the pixel of which the perception characteristic value U is 1 in the image 203 and causes the displaying unit 116 to display the acquired image. In the example illustrated in FIG. 4C, it is supposed that the inter-apparatus change amount W between the center image and the right-side image is larger than the inter-apparatus change amount W between the center image and the left-side image. In this case, the information outputting unit 115 superposes a hatched image having a larger brightness than that of the area between the center image and the left-side image, to the area between the center image and the right-side image. By doing so, the user using the first displaying apparatus 10 can grasp magnitude of the difference between the image displayed on the first displaying apparatus 10 and the image displayed on the second displaying apparatus 20.

Figure 4D:
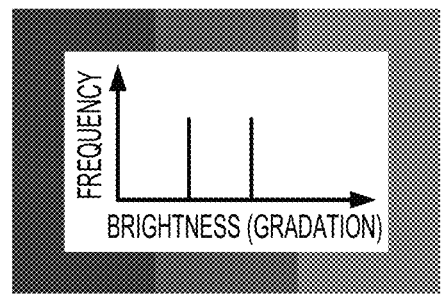

FIG. 4D is the diagram for describing an example in which the information outputting unit 115 causes the displaying unit 116 to display a frequency distribution diagram which indicates a frequency of occurrence of the brightness (that is, gradation value) in the pixel of which the perception characteristic value U is 1. Thus, since it is possible to can grasp at which brightness the pseudo contour is likely to occur, the user can adjust the image more easily.

Incidentally, in the examples of FIGS. 4B and 4C, the information outputting unit 115 superposes the hatched image at the position of the pixel of which the perception characteristic value U is 1. However, in the image 203, a color of the pixel of which the perception characteristic value U is 1 may be changed. Besides, the information outputting unit 115 may use a color corresponding to the value of the inter-apparatus change amount W.

Modified Example 1

In the above description, the information outputting unit 115 uses the inter-apparatus change amount W which is the difference between the first image characteristic value S1 and the second image characteristic value S2, as the difference between the first image characteristic and the second image characteristic. However, the difference between the first image characteristic and the second image characteristic is not limited to this. The information outputting unit 115 may set the brightness difference between at least one pixel of the first display image and the adjacent pixel as the first image characteristic, and set the brightness difference between the corresponding pixel of the second display image and the adjacent pixel as the second image characteristic. Besides, when a difference value between the brightness difference between at least the one pixel of the first display image and the adjacent pixel and the brightness difference between the corresponding pixel of the second display image and the adjacent pixel is equal to or larger than a predetermined threshold, the information outputting unit 115 may output the notification information.

The information outputting unit 115 may set the brightness change ratio between at least one pixel of the first display image and the adjacent pixel as the first image characteristic, and set the brightness change ratio between the corresponding pixel of the second display image and the adjacent pixel as the second image characteristic. Besides, when a difference value between the brightness change ratio between at least the one pixel of the first display image and the adjacent pixel and the brightness change ratio between the corresponding pixel of the second display image and the adjacent pixel is equal to or larger than a predetermined threshold, the information outputting unit 115 may output the notification information.

Modified Example 2

In the above description, the first displaying apparatus 10 for the image adjustment comprises the SDR liquid crystal monitor and the second displaying apparatus 20 for the final display comprises the HDR liquid crystal monitor. However, a display characteristic other than the displayable brightness may be different between the first displaying apparatus 10 and the second displaying apparatus 20. For example, the resolution of the first displaying apparatus 10 may be different from the resolution of the second displaying apparatus 20. Besides, the first displaying apparatus 10 and the second displaying apparatus 20 may be different kinds of monitors respectively. For example, the first displaying apparatus 10 may be a liquid crystal monitor, and the second displaying apparatus 20 may be an organic EL (electroluminescence) monitor.

<Effect of First Displaying Apparatus 10>

As described above, in the first displaying apparatus 10, the information outputting unit 115 outputs the notification information to the displaying unit 116 based on the difference between the first image characteristic and the second image characteristic respectively identified by the identifying unit 114. With such a constitution of the first displaying apparatus 10, the user can easily grasp that there is a possibility that a pseudo contour occurs due to a change in image quality between the first displaying apparatus 10 and the second displaying apparatus 20. Therefore, the present invention is suitable in case of adjusting the image quality of the display image by using the first displaying apparatus 10 and then outputting the adjusted display image to the second displaying apparatus 20.

Second Embodiment

In the first embodiment, the first displaying apparatus 10 identifies that there is the possibility that the pseudo contour occurs in the second displaying apparatus 20. The second embodiment is different from the first embodiment in the point that, in an electronic equipment different from the first displaying apparatus 10 and the second displaying apparatus 20, it is identified that a pseudo contour may occur in the second displaying apparatus 20. Hereinafter, only portions different from the first embodiment will be described, and the descriptions of the same portions as those of the first embodiment will be omitted as appropriate.

Figure 5:
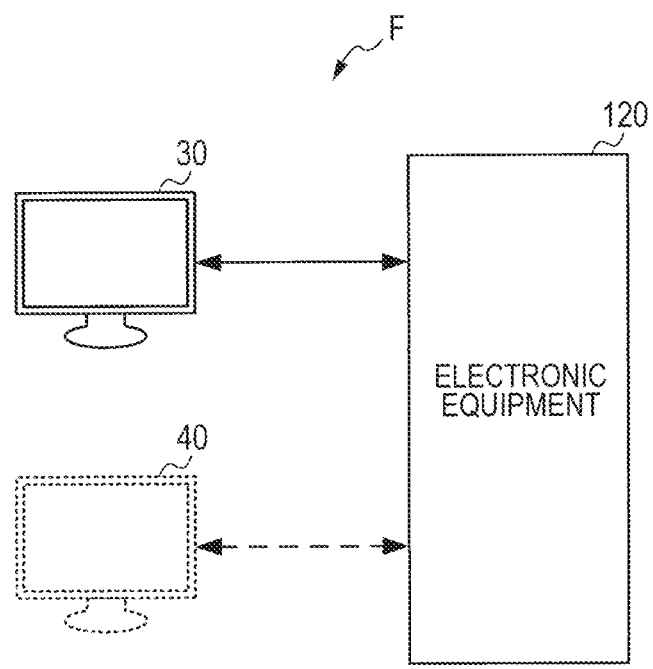
FIG. 5 is a diagram for describing an outline of the displaying system F according to a second embodiment.

FIG. 5 is a diagram for describing an outline of the displaying system F according to the second embodiment. The displaying system F comprises an electronic equipment 120, a first displaying apparatus 30 and a second displaying apparatus 40. For example, the electronic equipment 120 is a computer such as a personal computer, a smartphone, a tablet or the like. The first displaying apparatus 30 is, for example, an adjustment liquid crystal monitor for performing adjustment such as brightness correction, gamma correction and the like of a video signal, and has an SDR liquid crystal panel of the maximum brightness 400 cd/m$^2$. It is supposed that an image adjusted in the first displaying apparatus 30 is displayed on the second displaying apparatus 40. The second displaying apparatus 40 is, for example, a display liquid crystal monitor for finally displaying an image, and is an HDR monitor of the maximum brightness 1,000 cd/m$^2$.

In FIG. 5, the electronic equipment 120 and the first displaying apparatus 30 are mutually connected by, for example, a video cable. It is supposed that the second displaying apparatus 40 is a virtual displaying apparatus, and is not connected to the electronic equipment 120 and the second displaying apparatus 40. When a user (for example, a video editor) adjusts an image by displaying a display image on the first displaying apparatus 30, the user cannot visually confirm the display image that the display image is displayed on the second displaying apparatus 40. Incidentally, the second displaying apparatus 40 may be connected to the electronic equipment 120.

Figure 6:
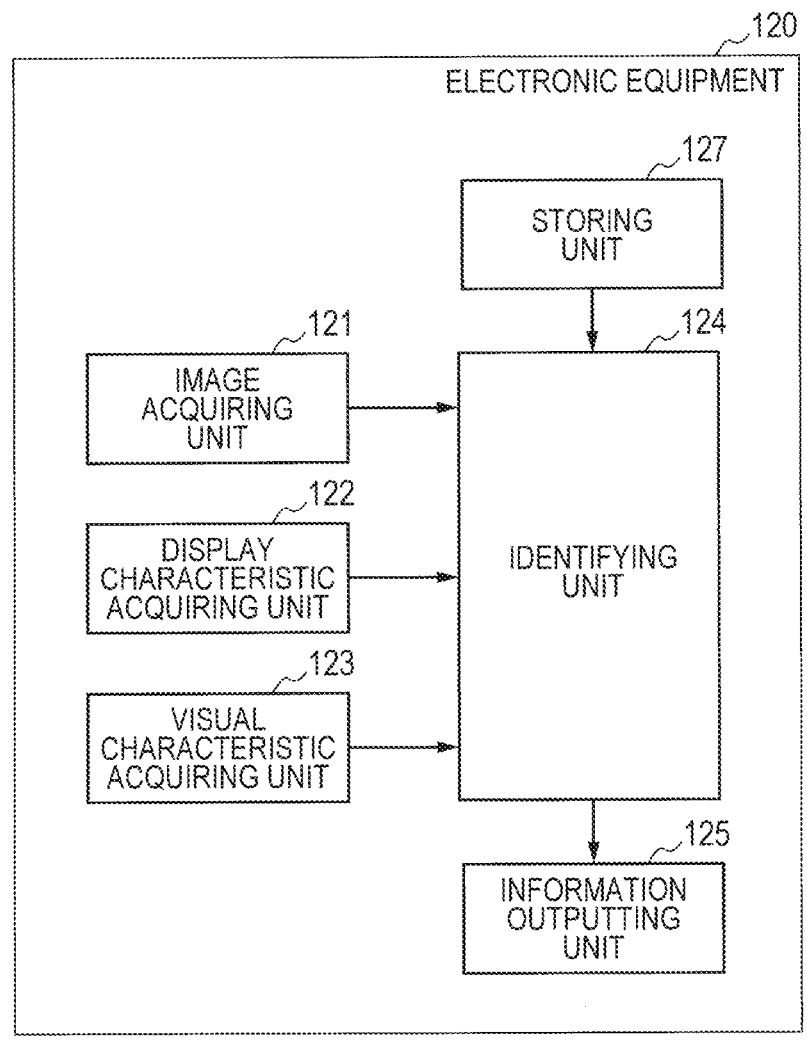
FIG. 6 is a diagram for describing a constitution of an electronic equipment 120 according to the second embodiment.

FIG. 6 is a diagram for describing the constitution of the electronic equipment 120. The electronic equipment 120 comprises an image acquiring unit 121, a display characteristic acquiring unit 122, a visual characteristic acquiring unit 123, an identifying unit 124, an information outputting unit 125 and a storing unit 127. Incidentally, it should be noted that the operation blocks having the same names as those of the respective operation blocks in the first embodiment have the same functions of the corresponding operations blocks in the first embodiment respectively.

The display characteristic acquiring unit 122 acquires a first display characteristic of the first displaying apparatus 30 displaying an image and a second display characteristic of the second displaying apparatus 40 different from the first displaying apparatus 30. The display characteristic acquiring unit 122 acquires a first maximum brightness and a first gamma characteristic of the first displaying apparatus 30 as the first display characteristic. Similarly, the display characteristic acquiring unit 122 acquires a second maximum brightness and a second gamma characteristic of the second displaying apparatus 40 as the second display characteristic. Then, the display characteristic acquiring unit 122 transmits the acquired first and second display characteristics to the identifying unit 124.

The identifying unit 124 includes, for example, a CPU. By executing a program stored in the storing unit 127, the identifying unit 124 identifies a first image characteristic of a first display image that the display image is displayed on the first displaying apparatus 30 based on the first display characteristic. Further, the identifying unit 124 identifies a second image characteristic of a second display image that the display image is displayed on the second displaying apparatus 40 based on the second display characteristic. For example, as well as the first embodiment, the identifying unit 124 identifies a first image characteristic value S1 and a second image characteristic value S2, and identifies an inter-apparatus change amount W which is a difference between the first image characteristic value S1 and the second image characteristic value S2. The information outputting unit 125 outputs notification information based on the difference between the first image characteristic and the second image characteristic to the first displaying apparatus 30.

<Effect of Electronic Equipment 120 of Second Embodiment>

As described above, in the second embodiment, the identifying unit 124 of the electronic equipment 120 identifies the first image characteristic and the second image characteristic. The information outputting unit 125 outputs the notification information based on the difference between the first image characteristic and the second image characteristic to the first displaying apparatus 30. By doing so, a user who adjusts image quality of an image by using the first displaying apparatus 30 can grasp a difference in image quality of the display images between the plurality of displaying apparatuses. Therefore, even if there is a difference in display characteristics between the first displaying apparatus 30 used for adjusting the image quality and the second displaying apparatus 40 displaying the adjusted image, it is easy for the user to adjust the image quality which is suitable for the second displaying apparatus 40.

Third Embodiment

In the first embodiment, a visible distance which is a distance between the user and the displaying apparatus at a time when the user visually confirms the displaying apparatus is not considered. However, in practice, it is conceivable that the visible distance when the user visually confirms the first displaying apparatus 10 and the visible distance when the user visually confirms the second displaying apparatus 20 are different from each other. When the visible distance changes, spatial resolution with respect to an optic angle changes, and when the spatial resolution changes, the visual characteristic changes. In the third embodiment, a constitution which is suitable for a case where the visible distance for the first displaying apparatus 10 and the visible distance for the second displaying apparatus 20 are different from each other will be described. Hereinafter, only portions different from the first embodiment will be described, and the descriptions of the same portions as those of the first embodiment will be omitted as appropriate.

FIG. 7 is a diagram for describing the constitution of the first displaying apparatus 10 according to the third embodiment. The first displaying apparatus 10 illustrated in FIG. 7 is different from the first displaying apparatus 10 of the first embodiment illustrated in FIG. 2 in the point that a distance acquiring unit 118 is provided. Namely, other portions of the first displaying apparatuses are the same between the present embodiment and the first embodiment. The distance acquiring unit 118 acquires at least one of a distance La (FIG. 8A) between the user H who visually confirms the first displaying apparatus 10 and the first displaying apparatus 10 and a distance Lb (FIG. 8B) between the user H who visually confirms the second displaying apparatus 20 and the second displaying apparatus 20. For example, the distance acquiring unit 118 acquires the distance La and the distance Lb respectively input by the user.

Figure 8A:
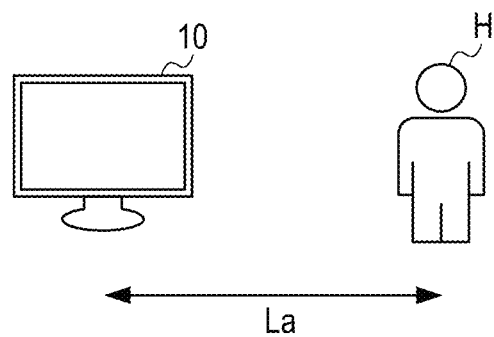
FIGS. 8A and 8B are diagrams for describing a visible distance.
Figure 8B:
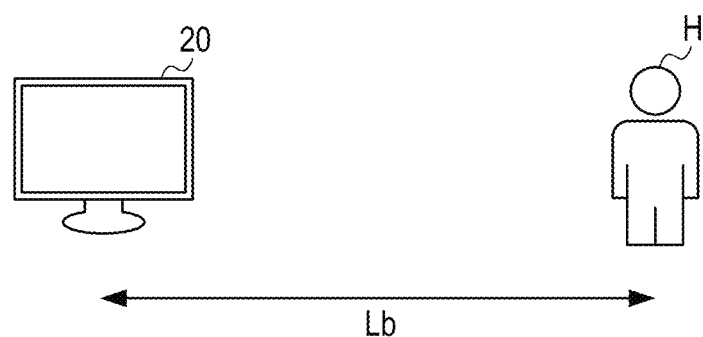

FIGS. 8A and 8B are the diagrams for describing the visible distances. FIG. 8A indicates that the user H visually confirms the first displaying apparatus 10 at the distance La away. FIG. 8B indicates that the user H visually confirms the second displaying apparatus 20 at the distance Lb away. Here, it is assumed that La<Lb.

Figure 9:
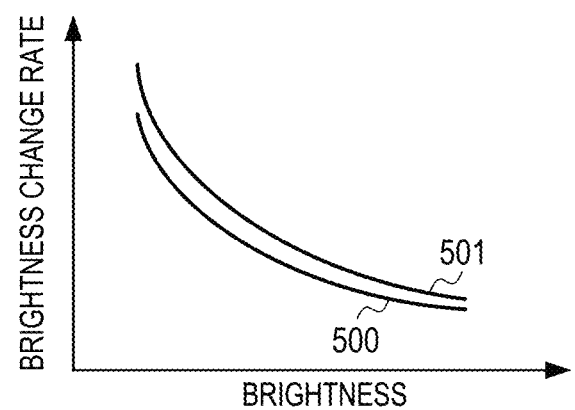
FIG. 9 is a diagram for describing a relation between the visible distance and the visual characteristic.

FIG. 9 is a diagram for describing the relation between the visible distance and the visual characteristic. The visual characteristic 500 in FIG. 9 represents the visual characteristic which is acquired when the user visually confirms the first displaying apparatus 10 at the distance La away. A visual characteristic 501 in FIG. 9 represents the visual characteristic which is acquired when the user visually confirms the second displaying apparatus 20 at the distance Lb away.

The identifying unit 124 identifies the first image characteristic based on the visual characteristic and the first display characteristic at the distance La acquired by the distance acquiring unit 118. Besides, the identifying unit 124 identifies the second image characteristic based on the visual characteristic and the second display characteristic at the distance Lb acquired by the distance acquiring unit 118. The concrete method by which the identifying unit 124 identifies the image characteristic is the same as that described in the first embodiment, and the description thereof will be omitted. By doing so, the identifying unit 124 can identify the second image characteristic according to the distance, and the information outputting unit 125 can output a change in visual characteristic according to the visible distance as notification information.

<Effect of First Displaying Apparatus 10 of Third Embodiment>

As described above, according to the third embodiment, the identifying unit 114 of the first displaying apparatus 10 identifies the second image characteristic, on the basis of the second display characteristic of the second displaying apparatus 20 and the visual characteristic corresponding to the distance Lb between the user H visually confirming the second displaying apparatus 20 and the second displaying apparatus 20. By doing so, the user can grasp the difference in image quality according to the distance, so that it is possible to adjust the image to an appropriate image according to the visual confirmation distance.

Fourth Embodiment

The fourth embodiment is different from each of the above embodiments in the point that the display characteristic of the displaying apparatus is transmitted together with the display image. For example, a case where the camera 1 illustrated in FIG. 1 stores the display characteristic of a display liquid crystal monitor which finally displays an image will be described.

The camera 1 transmits a captured image and tag information indicating the second display characteristic of the second displaying apparatus 20. The tag information includes information indicating the maximum brightness and the gamma characteristic of the second displaying apparatus 20.

The image acquiring unit 111 of the first displaying apparatus 10 acquires the tag information together with the display image transmitted by the camera 1, and transmits the acquired tag information to the identifying unit 124. The identifying unit 124 identifies the second image characteristic based on the display image and the second display characteristic indicated by the tag information.

By doing so, a user does not need to set the display characteristic of the second displaying apparatus 20 in the first displaying apparatus 10, so that it is possible to prevent that an erroneous second display characteristic is set due to an erroneous operation. As a result, it is possible for the user to appropriately adjust image quality based on the correct second display characteristic of the second displaying apparatus 20.

As just described, the present invention has been described based on the embodiments and the modified examples. Here, it should be noted that a new embodiment caused by any combination of them is also included in the embodiment of the present invention. The effect of the new embodiment caused by the combination has the effects of the original embodiments. Besides, the technical scope of the present invention is not limited to the range described in the above embodiments, and various modifications and changes are possible within the scope of the gist or substance thereof.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-196223, filed Oct. 4, 2016, which is hereby incorporated by reference herein in its entirety.

What is claimed is:

1. An information outputting method to be performed by a computer, the method comprising:
an image acquiring step of acquiring image data;
an identifying step of identifying a first image characteristic of a first display image which is displayed using a first display characteristic of a first displaying apparatus and is based on the image data, and of identifying a second image characteristic of a second display image which is displayed using a second display characteristic of a second displaying apparatus different from the first displaying apparatus and is based on the image data; and
an information outputting step of causing displaying unit of the first displaying apparatus to display an image obtained by superimposing notification information based on a difference between the first image characteristic and the second image characteristic, on the first display image.

2. The information outputting method according to claim 1, further comprising a visual characteristic acquiring step of acquiring a visual characteristic related to a human-perceivable brightness difference between adjacent pixels, wherein
in the identifying step, based on the visual characteristic, the first image characteristic related to whether or not the brightness difference between certain adjacent pixels in the first display image is human perceivable, and the second image characteristic related to whether or not the brightness difference between certain adjacent pixels in the second display image is human perceivable are identified.

3. The information outputting method according to claim 2, wherein, in the information outputting step, the notification information is output in a case where it is determined that the first image characteristic indicates that the brightness difference between the certain adjacent pixels in the first display image is not human perceivable and the second image characteristic indicates that the brightness difference between the certain adjacent pixels in the second display image is human perceivable.

4. The information outputting method according to claim 3, wherein, in the information outputting step, the notification information enabling to recognize positions being the adjacent pixels of which the brightness difference is not human perceivable in the first display image and being the adjacent pixels of which the brightness difference is human perceivable in the second display image is output.

5. The information outputting method according to claim 3, wherein, in the information outputting step, the notification information emphasis-displaying positions being the adjacent pixels of which the brightness difference is not human perceivable in the first display image and being the adjacent pixels of which the brightness difference is human perceivable in the second display image is output.

6. The information outputting method according to claim 1, wherein, in the information outputting step, the notification information is output in a case where a difference between the first image characteristic between at least any adjacent pixels among the plurality of pixels in the first display image and the second image characteristic between at least any adjacent pixels among the plurality of pixels in the second display image is equal to or larger than a predetermined threshold.

7. The information outputting method according to claim 1, wherein, in the identifying step, a brightness value of the first display image is identified based on a brightness value of the image data and the first display characteristic, and a brightness value of the second display image is identified based on the brightness value of the image data and the second display characteristic.

8. The information outputting method according to claim 7, wherein
the first display characteristic includes a gamma characteristic of the first displaying apparatus, and
the second display characteristic includes a gamma characteristic of the second displaying apparatus.

9. The information outputting method according to claim 7, wherein
the first display characteristic includes a maximum brightness of the first displaying apparatus, and
the second display characteristic includes a maximum brightness of the second displaying apparatus.

10. The information outputting method according to claim 9, wherein the maximum brightness of the first displaying apparatus is smaller than the maximum brightness of the second displaying apparatus.

11. The information outputting method according to claim 1, wherein, in the information outputting step, an image on which the notification information has been superposed is displayed on at least any one of the first displaying apparatus and the second displaying apparatus.

12. The information outputting method according to claim 1, wherein, in the identifying step, the first display characteristic and the second display characteristic stored in a storing unit are acquired from the storing unit.

13. The information outputting method according to claim 1, further comprising a display characteristic acquiring step of acquiring the second display characteristic input by a user operating the operation unit of the first displaying apparatus.

14. The information outputting method according to claim 1, wherein
the first displaying apparatus has a standard dynamic range, and
the second displaying apparatus has a high dynamic range.

15. An electronic equipment comprising:
an image acquiring unit configured to acquire image data;
an identifying unit configured to identify a first image characteristic of a first display image which is displayed using a first display characteristic of a first displaying apparatus and is based on the image data, and to identify a second image characteristic of a second display image which is displayed using a second display characteristic of a second displaying apparatus different from the first displaying apparatus and is based on the image data; and
an information outputting unit configured to cause a displaying unit of the first displaying apparatus to display an image obtained by superimposing notification information based on a difference between the first image characteristic and the second image characteristic, on the first display image,
wherein the image acquiring unit, the identifying unit and the information outputting unit are implemented via at least one processor.

16. A displaying apparatus comprising:
an image acquiring unit configured to acquire image data;
a displaying unit configured to display a first display image based on the image data;
an identifying unit configured to identify a first image characteristic of the first display image which is displayed on the displaying unit by using a first display characteristic of the displaying apparatus, and to identify a second image characteristic of a second display image which is displayed using a second display characteristic of another displaying apparatus and is based on the image data; and
an information outputting unit configured to cause the displaying unit to display an image obtained by superposing notification information based on a difference between the first image characteristic and the second image characteristic, on the first display image,
wherein the image acquiring unit, the identifying unit and the information outputting unit are implemented via at least one processor.

* * * * *